Oct. 17, 1967  H. W. BOOTHROYD  3,347,104
VERNIER BALANCING AND DAMPING FOR GYRO SYSTEMS
Filed Oct. 24, 1963  2 Sheets-Sheet 1
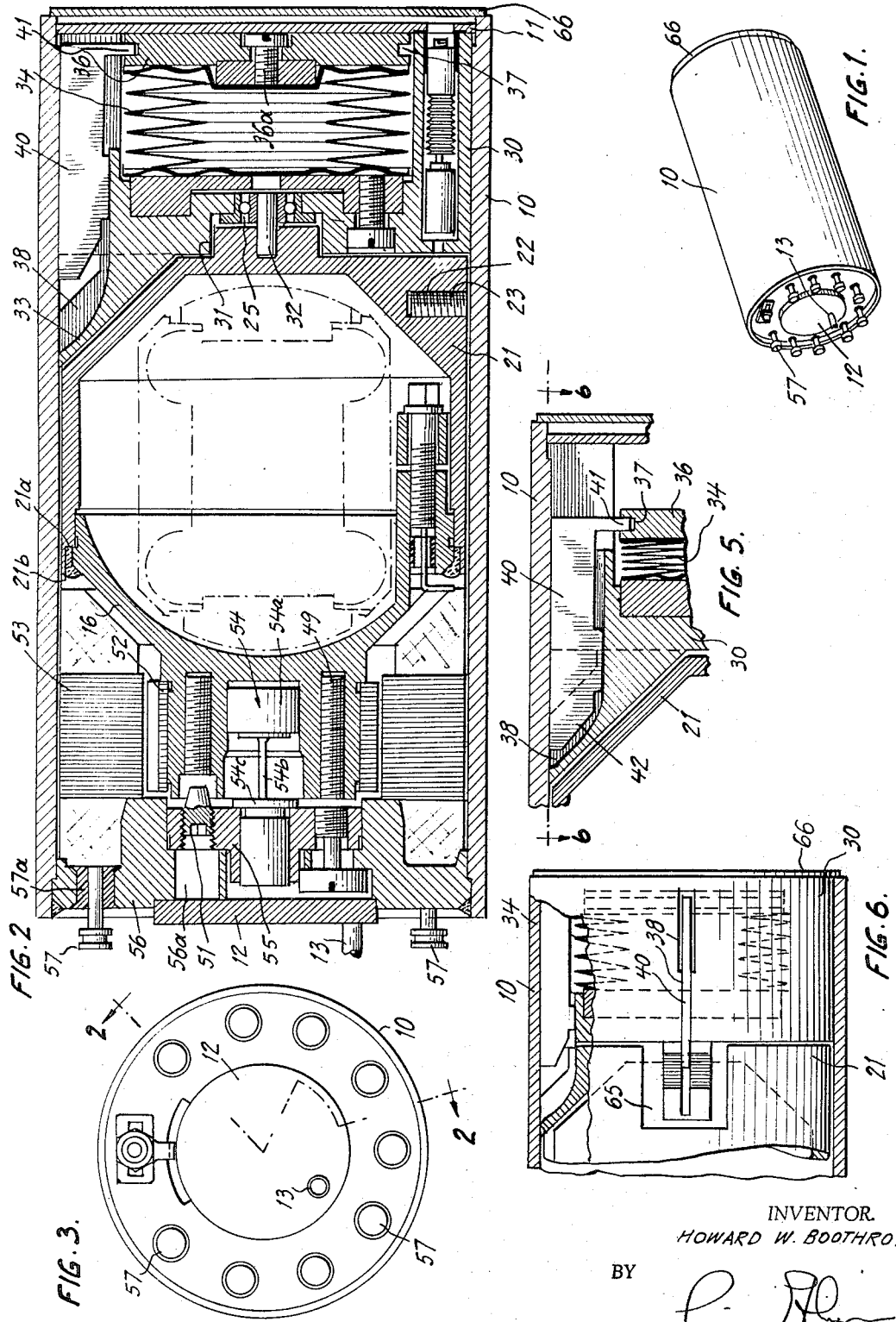
INVENTOR.
HOWARD W. BOOTHROYD
BY
ATTORNEY

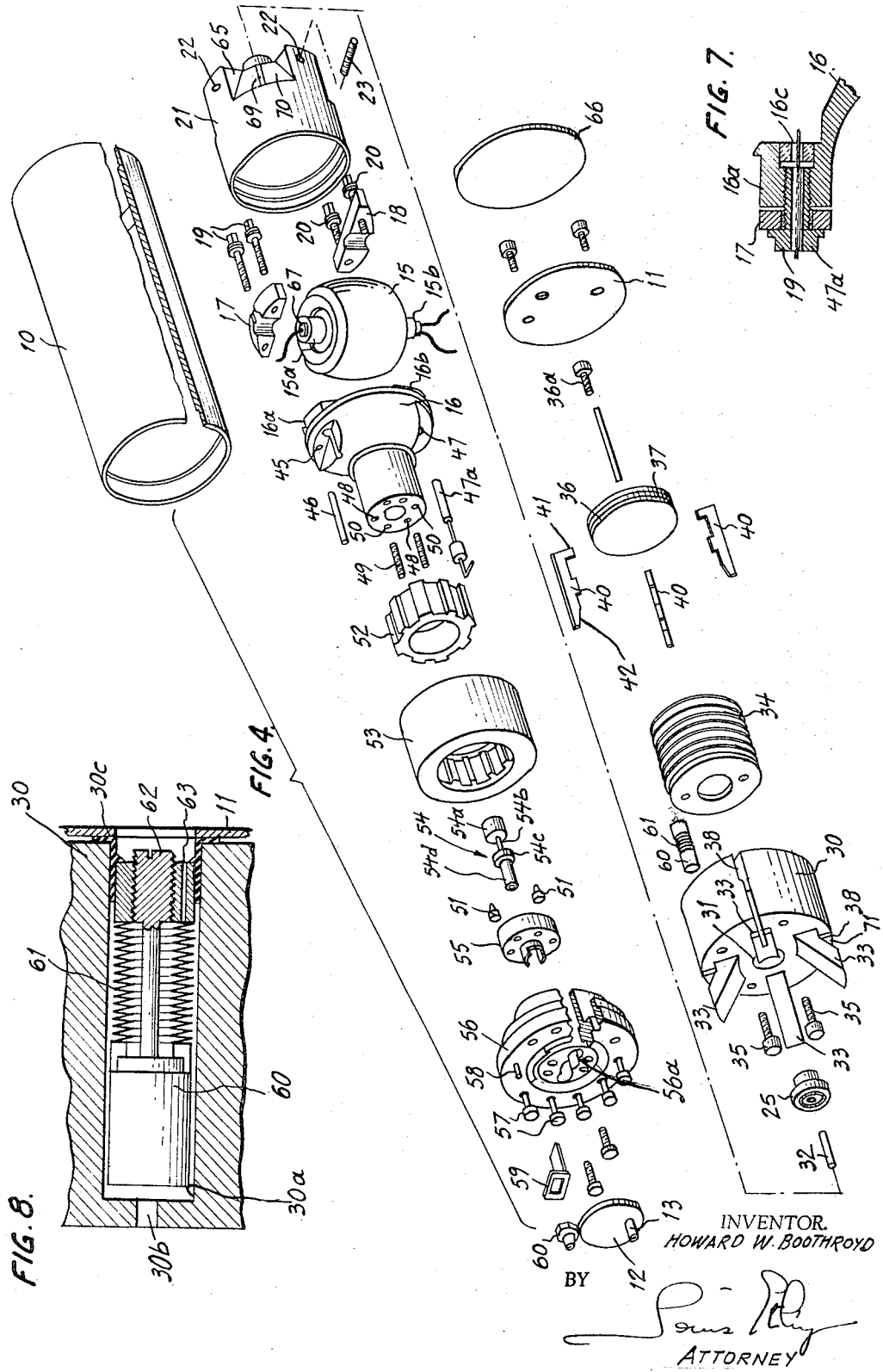

United States Patent Office 3,347,104
Patented Oct. 17, 1967

3,347,104
VERNIER BALANCING AND DAMPING FOR GYRO SYSTEMS
Howard W. Boothroyd, Amherst, N.H., assignor to Sanders Associates, Inc., Nashua, N.H., a corporation of Delaware
Filed Oct. 24, 1963, Ser. No. 318,588
16 Claims. (Cl. 74—5.5)

This invention relates to gyros and more particularly to fluid damped rate gyros.

In such instruments, the gyro wheel is mounted in a gimbal system in such a manner as to have only one degree of freedom, and the spin axis is oriented in such a manner that rotation about the input axis causes the gyro to develop a torque, producing rotation about its single axis of freedom. Such rotation is opposed by resilient action, so that a quantitative indication of the action to be measured is given.

Rotation of the gyro about its axis of freedom, as above mentioned, is damped by fluid, more particularly liquid, and the damping liquid separates the gimbal assembly from the outer housing by a small space, of the order of 0.007 inch, thereby providing relatively high shock protection for the gyro mechanism, even with preferred low viscosity damping liquid.

It has been found that changes in temperature cause changes in the damping, due to changes is viscosity of the liquid with temperature, which in turn affect the reading obtained. Accordingly, it is desirable to provide a damping system affording constant damping with wide variations of temperature.

It is desirable that a gyro of the type to which this invention may be applied, and which has only one degree of freedom, be very precisely balanced about its precessional axis, to eliminate the error effects of linear acceleration on the output signals of the system. In the past, this balance has been achieved by inserting a screw into a hole in the gimbal at the maximum distance from the axis. It sometimes happens that such a method over-corrects the balance by applying too much weight too far from the axis. This in turn requires removal of weight from the balancing screw, by filing or machining, an expensive process.

A further difficulty is encountered. In instruments of this type, the balancing screw is inaccessible after the instrument has been assembled in the housing. If it is found to be unbalanced after assembly in the housing, then the instrument must be disassembled, re-balanced, and re-assembled, which adds to the time and cost of manufacture.

Still another difficulty has been encountered in the maintenance of constant damping over a range of temperatures of the damping fluid. In instruments of this type, the damping is controlled by a bellows which operates gates controlling the cross-sectional area through which the damping fluid flows, thereby increasing or decreasing the damping. It may happen that when the system is filled with damping liquid, which is usually done at room temperature, inaccuracies in the damping test while injecting the damping liquid may result in an incorrect position of the bellows or gates, resulting in incorrect damping, particularly at cold temperatures.

In accordance with the present invention, I provide a vernier balance adjustment which can be adjusted from the outside of the instrument housing, just prior to fluid filling, and I also provide a vernier adjustment of the bellows which controls the damping.

Among the objects of this invention are:

To provide an improved vernier balancing system which permits obtaining of a fine balance without the necessity of filing or removing stock from the balancing screws employed;

To provide such a balancing system which may be adjusted from the exterior of the instrument, without the necessity of disassembly;

To provide a two-part balancing system in which one part may be adjusted to give a coarse or approximate balance, and in which the other part may be adjusted to give a fine or vernier action;

To provide such a system which permits a fine adjustment of balance after the instrument is in its final assembled condition (in its housing just prior to fluid filling);

To provide a fine damping control which may be reset or readjusted to the correct damping rate, without opening, cleaning, sealing, and refilling of the instrument, heretofore necessary with gyros of the sealed and damped type.

Still other objects and advantages of my invention will be apparent from the specification.

The features of novelty which I believe to be characteristic of my invention are set forth with particularity in the appended claims. My invention itself, however, both as to its fundamental principles and as to its particular embodiments, will best be understood by reference to the specification and accompanying drawing, in which FIG. 1 is a perspective side view of a gyroscope embodying the present invention, FIG. 2 is an enlarged view, partly in section, on lines 2—2 of FIG. 3, FIG. 3 is an end view of the gyro in accordance with my invention, FIG. 4 is an exploded perspective view of the gyro shown in FIGS. 1 and 2, FIG. 5 is a detailed diagrammatic view showing one movable gate for maintaining constant damping, FIG. 6 is a similar view on lines 6—6 of FIG. 5, FIG. 7 is a detail of the motor lead seal, and FIG. 8 is a diagrammatic sectional view of the vernier damping rate adjustment according to this invention.

Referring now more particularly to FIG. 1, 10 designates the cylindrical housing shown partly broken away in FIG. 4, having rear cover plate 11, rear name plate 66, and front end cap and cover plate 12, the latter carrying a projecting filler tube 13, through which damping liquid may be introduced into or removed from housing 10. This housing contains the gyro, the gimbal system, the torsion bar, the pick-off rotor and stator, and other parts as will be described.

The motor-gyro unit 15, having shaft 67 with bearing preload nuts 15a and 15b, respectively at the top and bottom, is mounted on the forward gimbal section 16 provided with upper and lower pillow blocks 16a and 16b formed to receive the upper and lower bearing preload nuts 15a and 15b. The motor-gyro unit 15 is secured to the forward gimbal section 16 by bearing caps 17 and 18, each fastened in position by bearing cap bolts 19 and 20, engaging the pillow blocks 16a and 16b respectively.

Bearing cap bolts 19 and 20 are preferably hollow, as shown in FIG. 7, to permit passage of the motor leads from the outside to the inside of the gimbal, and the outer side of the forward gimbal section 16 is provided with a glass seal 16c soldered into the gimbal, through which the motor lead passes. The glass feed-through soldered into the hole in the gimbal forms a hermetic seal, while still permitting passage of the motor lead into the gimbal. While only one is shown in FIG. 7, it will be understood that such a construction is preferably employed to bring all the motor leads into the interior of the gimbal.

The forward gimbal section 16, with the motor-gyro unit attached, is inserted by press fit a short distance into the rear gimbal section 21, to abut against inner locating cylindrical stop 21a (FIG. 2), and the joint between the forward gimbal section 16 and the rear gimbal section 21 is preferably solder sealed as at 21b (FIG. 2), so that the entire gimbal unit is hermetically sealed. The outer gimbal is provided with a tapped hole 22 to receive balance screw 23, by the adjustment of which the system may be balanced to eliminate the effect of linear acceleration on the system.

The rear gimbal section 21 rotates in ball bearing assembly 25 surrounding pivot pin 32 to permit rotation of the gimbal system. The outer end of rear gimbal 21 is provided with four inwardly extending cutouts 65 spaced 90° apart circumferentially.

The inclined surface of cutouts 65 is frustoconical, except for a central flat portion 69 provided for clearance to permit rotation of the gimbal with respect to paddle block 30, and prevent binding.

Adjacent the outer end of rear gimbal section 21, and fixed to housing 10, there is mounted a hollow cylindrical paddle block 30 having a central opening 31. Pin 32 is secured in the end of rear gimbal section 21. The forward end of paddle block 30 is provided with four outwardly inclined arms 33 which register with the four cutouts 65 in the outer end of rear gimbal section 21. The cutouts have a flat portion 69 to provide a close fit with arms 33. The slope surfaces 70 provide clearance for arms 33 when the assembly rotates.

Mounted within the paddle block 30 is sealed bellows 34, having its forward end secured to the paddle block by screws 35. Secured to the rear (free) end of bellows 34 by screw 36a is cylindrical guide plate 36, having a circumferentially extending groove 37. The paddle block 30 is provided with four longitudinally extending slots 38, spaced 90° apart circumfentially, each along the center line of each outwardly extending arm 33 respectively.

Four sliding gates 40 are provided, each gate having a straight edge cut off at an angle at 42, and having at its rear end a projection 41. One gate is inserted in each slot 38, with projection 41 riding in the cylindrical groove 37 of guide plate 36. The length of the gates is so chosen that when the bellows 34 is collapsed, the gates move forwardly to completely close apertures 71 in arms 33, and as the bellows expands, it carries the gates in a direction away from arms 33, such that apertures 71 are gradually opened.

Bellows 34 is sealed, and is immersed in the damping liquid within housing 10, and it will be understood that as the volume of the damping fluid is increased by a temperature increase, the bellows moves in a direction to collapse, and moves the gates toward arms 33, thereby reducing or closing the apertures 71 through which the damping liquid can flow, and increasing the damping action. As the volume of the damping liquid decreases, the reverse action occurs.

How this occurs will now be explained. The clearance between arms 33 on the paddle block 30 and the sides of the cutouts leaves cavities on each side of arms 33. The undercutting of arms 33 near the bottom on the outside forms apertures 71 through which the damping liquid can flow between the cavities when the bellows is expanded and the gates are open. This provides minimum damping at low temperatures when the volume of liquid is a minimum.

As the temperature increases, the liquid expands, the bellows moves in a direction to collapse, moving gates 40 toward arms 33, thereby reducing and finally closing apertures 71, preventing flow of liquid between the cavities, and providing maximum damping for rotation of the gimbal. As the volume of the damping liquid decreases, due to drop in temperature, the reverse action occurs, as will be clear from FIGS. 5 and 6. Volumetric changes of the damping liquid are directly proportional to temperature changes. The constants of the bellows assembly, the arms 33, the walls of cutouts 65, the flat portions 69, and elements which determine the size, of the apertures 71 are selected so that the damping remains constant, regardless of temperature.

Referring now more particularly to FIG. 4, the forward gimbal section 16 is provided with an opening 45 to which is attached an evacuation tube 46, by means of which the interior of the gimbal assembly may be evacuated after the forward and rear gimbals are assembled and sealed. Similarly, openings 47 are provided for bringing out the motor leads, these being provided with insulating sleeves 47a where they pass through the bearing cap screws.

The forward face of the forward gimbal section 16 may be provided with a series of tapped holes 48 for receiving balancing set screws 49, the number of which may be chosen to fit particular conditions. There may be none, or up to several, and offcenter counterbored holes 50 may be provided to receive stop screws 51. These screws may be adjusted through central holes 56a in end cap 56, and are located and secured in torsion plate 55.

At this point it may be noted that the balancing torque introduced by coarse balancing screw 23 is represented by $$T_1 = (W_1) \times (R_1)$$

where $W_1$ is the weight of the screw and $R_1$ the lever arm. Now considering fine balancing screw 49, the balancing torque introduced by screw 49 is represented by $$T_2 = (W_2) \times (R_2)$$

where $W_2$ is the weight of the screw and $R_2$ the lever arm, and it will be noted that $R_2$ is less than $\frac{1}{2} R_1$ therefore providing for a vernier or fine balance means.

Pick-off rotor 52 is secured around the neck portion of forward gimbal section 16 to rotate therewith, within pick-off stator 53, and, since the pick-off system per se is well known under the name "Microsyn," no further description of it is believed necessary. The input and output windings which surround the stator poles have been omitted from FIG. 4.

In pick-off systems of the type used herein, rotation of the gimbal assembly is ordinarily not substantially more than 3° in either direction from cetnral position. To assure this, rotational stop pins 51 are provided. Rotational resilient action is provided by torsion bar 54. This consists of cylindrical plug 54a which fits the central hole in the forward face of forward gimbal section 16, has a much reduced torsion portion 54b terminating in collar 54c, and having an extension 54d, tapped to receive a screw (not shown) to secure it to torsion plate 55 having a central opening to receive extension 54d.

The torsion bar and torsion plate assembly are fitted within a central depression in the rear face of front end cap 56. The pick-off stator 53 is bonded directly to the front end cap which carries a series of terminals 57 passing through insulating pushing 57a through which connections are made to the primary and secondary coils surrounding the poles of the pick-off stator (FIG. 2). This bonding of the stator to the end cap, instead of mounting or putting it in the housing as heretofore, prevents or minimizes changes in diameter of the stator, which produce spurious signals due to changes in the inductive pattern in the pick-off stator.

A form of vernier damping adjustment which may be employed is shown in FIG. 8. This has the advantage of permitting vernier adjustment of the damping system setting without opening the system, draining, and refilling.

During the filling of the system with damping liquid, it is subjected to a damping test at room temperature, and liquid is injected into the system, causing the main bellows 34 to collapse partially until the correct damping is registered, at which point the system is sealed. It may happen that, due to inaccuracies in the damping test, the position of the bellows and gates may be ±0.005″ from the correct position. This correct position is far more critical at low temperatures (−55° C.), and the damping at this temperature will determine the correct setting. The present invention, as shown in FIG. 8, will permit the damping adjustment to be made at cold temperature to secure the correct gate position at such temperature.

Referring now more particularly to FIG. 8, the paddle block 30 has an opening 30a in which is mounted a movable piston 60, and the forward end of the paddle block has an axial port 30b to admit damping liquid, which passes around the piston and surrounds the vernier bellows 61. The forward end of vernier bellows 61 is attached to the rear face of the piston 60, and the rear end of the bellows is vented to atmosphere through vent 63 and sealed by seal 30c to the paddle block 30.

A threaded stud 62 passes through the vented end of the bellows and has its forward end attached to the piston 60, with freedom of rotation. In operation, when the stud 62 is turned to move in a direction away from the piston, the bellows partially collapses, and its total volume is decreased. Liquid (a fixed quantity of which is sealed in the system) enters behind the piston through port 30b to compensate for this volume decrease. This in turn causes the main damping compensator bellows 34 to move a small amount to compensate for the volume decrease, and this in turn causes a corresponding movement of the gates 40, to increase the areas of fluid apertures and decrease the damping. The diameters are preferably so proportioned that a linear travel of the vernier control (stud 62) of 0.064″ causes the outer end of the compensator bellows 34 to move a linear distance of 0.006″. Two vernier devices may be used in each gyro such that ±0.006″ gate adjustment will be available. At filling, both vernier devices will be set at the midpoint of their travel to provide final adjustment in both directions.

It is desirable to place the vernier devices in the paddle block so that the vernier control stud 62 is accessible to a screw driver, through appropriate openings in the back cover plate 11, which openings may be covered by a removable plate, thus permitting vernier adjustment of the damping, without draining, adjusting, and refilling the system. Under certain conditions it may be found that the desired vernier control may be obtained with the use of only one vernier device, but more than one may be provided if desired.

The end cap 56 also carries null adjusting screw 58, and fine null adjust plate 59 and nut 60 for securing the fine null adjust plate in position. This feature is not per se a part of the invention claimed herein, but is covered in a separate application assigned to the assignee of this application.

In the foregoing, I have described certain preferred embodiments of my invention, and the best mode presently known to me for practicing it, and it should be understood that modifications and changes may be made without departing from the spirit and scope of my invention.

I claim:

1. In a fluid damped gyro system having a motor-gyro unit sealed within a gimbal, mounted within a housing containing damping fluid, a coarse adjustment balancing screw in said gimbal at a maximum distance from the axis of rotation, and at least one fine balancing screw in the said gimbal, the radial distance of said fine balancing screw from the axis of rotation of said gimbal being substantially less than that of the coarse adjustment balancing screw.

2. The combination claimed in claim 1 in which the torque arm of said fine balancing screw is less than half of that of the coarse adjustment balancing screw.

3. The combination claimed in claim 1 in which one of said balancing screws is radially adjustable and the other is axially adjustable with respect to the axis of rotation of said gimbal.

4. The combination claimed in claim 1 in which one of said balancing screws is adjustable from the exterior of said housing.

5. The combination claimed in claim 1 in which the fine balancing screw is axially adjustable with respect to the axis of rotation of said gimbal from the outside of said housing.

6. The combination claimed in claim 1 in which said gimbal has a hole receiving a balancing weight which is radially adjustable with respect to said gimbal and also having a plurality of openings to receive a plurality of balancing screws which are axially adjustable with respect to said gimbal.

7. The combination claimed in claim 6 in which said axially adjustable balancing screws are accessible from outside said housing.

8. In a liquid damped gyro system, a main damping control bellows, a vernier damping control comprising, in combination, a block having an opening therein, a piston in said opening, a bellows in said opening behind said piston, a stud passing through said bellows and having its front end attached to said piston, said stud being longitudinally adjustable, said block having a port admitting damping liquid around said bellows, and means operatively connecting the bellows of said vernier damping control to said main damping control bellows.

9. The combination claimed in claim 8 in which the diameters are so chosen that a given linear movement of said stud produces a substantially smaller linear movement of the rear end of said main damping control bellows.

10. The combination claimed in claim 8 in which linear movement of said stud produces a substantially less linear movement of the rear end of said main damping control bellows.

11. The combination claimed in claim 8 in which linear movement of said stud produces linear movement of the rear end of said main damping control bellows of the order of one tenth of the linear movement of said stud.

12. In a liquid damped sealed gyro system, a main damping compensating bellows, movable gates operated by said bellows, and a vernier damping control means comprising a vernier bellows and a piston mounted in a chamber accessible to the liquid in said system, an adjustable stud for rotation to control the position of said piston, and means operatively connecting the vernier bellows to said main damping compensation bellows.

13. The combination claimed in claim 12 in which said stud passes longitudinally through said vernier bellows and is attached at its forward end to said piston.

14. In a liquid damped sealed gyro system, a main damping compensating bellows, movable gates operated by said bellows, and a pair of vernier damping control means, each comprising a vernier bellows and a piston mounted in a chamber, an adjustable stud for rotation to control the position of said piston, and means operatively connecting said vernier bellows to said main damping compensation bellows.

15. In a fluid damped gyro system having a housing, a motor-gyro unit mounted in a gimbal within said housing, a pick-off rotor mounted on said gimbal, an end cap, and a pick-off stator secured to said end cap, a main damping compensating bellows, movable gates operated by said bellows, and a pair of vernier damping control means, each comprising a vernier bellows and a piston mounted in a chamber, an adjustable stud for rotation to control the position of said piston, and means operatively connecting said vernier bellows to said main damping compensation bellows.

16. In a fluid damped gyro system having a housing, a motor-gyro unit sealed within a gimbal completely enclosing said motor gyro unit, a pick-off rotor secured to said gimbal for rotary motion therewith, and a pick-off stator mounted within said housing exterior to said gimbal, a main damping compensating bellows, movable gates operated by said bellows, and a pair of vernier damping control means, each comprising a vernier bellows and a piston mounted in a chamber, an adjustable stud for rotation to control the position of said piston, and means operatively connecting said vernier bellows to said main damping compensation bellows.

References Cited

UNITED STATES PATENTS

| | | | |
|---|---|---|---|
| 2,855,782 | 10/1958 | Grohe | 74—5.4 |
| 2,945,380 | 7/1960 | Pope et al. | 74—5.5 |

FRED C. MATTERN, JR., *Primary Examiner.*

PALMER W. SULLIVAN, *Examiner.*

C. J. HUSAR, *Assistant Examiner.*